Jan. 1, 1952     W. L. KEEN     2,581,259
AUTOMATIC SELF-RELEASING AND CASTING FLOAT
Filed July 29, 1949     2 SHEETS—SHEET 1

William Lee Keen,
Inventor.
Koenig and Pope,
Attorneys.

Jan. 1, 1952 W. L. KEEN 2,581,259
AUTOMATIC SELF-RELEASING AND CASTING FLOAT
Filed July 29, 1949 2 SHEETS—SHEET 2

William Lee Keen
INVENTOR.

BY

Patented Jan. 1, 1952

2,581,259

UNITED STATES PATENT OFFICE 2,581,259

AUTOMATIC SELF-RELEASING AND CASTING FLOAT

William Lee Keen, St. Louis, Mo.

Application July 29, 1949, Serial No. 107,512

10 Claims. (Cl. 43—44.91)

This invention relates to fishing floats, and more particularly to fishing floats of the type slidable on a fishing line.

Among the several objects of the invention may be noted the provision of an improved and simplified fishing float of the class described which may be readily adjusted to different positions on the fishing line and held in any desired position corresponding to the depth at which it is desired to have the fishing hook at the end of the line; the provision of a float of this class which may be either manually released from the line or, alternatively, automatically released from the line by tensioning the line; and the provision of a float such as described which is reliable in operation and economical to manufacture.

In general, the above objects are attained according to this invention in a fishing float comprising a buoyant body having a passage therethrough for a fishing line. The body also has a plunger guide opening intersecting the line passage. This guide opening leads from the outside of the body all the way to one side of the line passage, and also has a continuation on the other side of the line passage. A plunger is freely slidable in the guide opening. This plunger is somewhat longer than the length of the opening from the line passage to the outside of the body, so that its outer end projects from the body. The float is further provided with stop means coacting with the plunger for determining a retracted position of the plunger wherein its inner end is clear of the line passage on said one side thereof, and in which position of the plunger the fishing line is freely slidable in the line passage. The plunger is movable to a line-wedging position wherein its inner end extends into the continuation of the guide opening on the other side of the line passage for wedging the fishing line into the said continuation. The stop means also prevents the plunger from coming out of the guide opening. The plunger is adapted to be moved from its line-wedging position to its retracted position either by pulling it outward by its outer end, or in response to tensioning of the fishing line. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawing, in which one of various possible embodiments of the invention is illustrated, Fig. 1 is a view in side elevation of a fishing float embodying the invention;

Similar reference characters indicate corresponding parts throughout the several views of the drawing.

Figure 1:
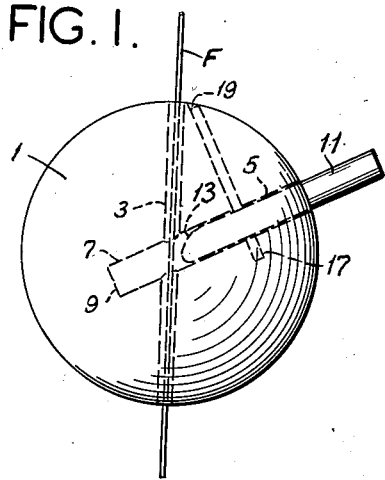
Figure 2:
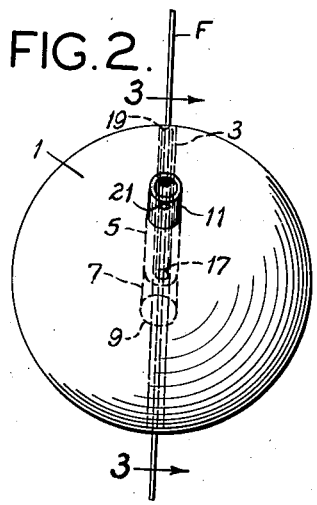
Fig. 2 is a right side elevation of Fig. 1.

Referring to the drawing, a fishing float constructed in accordance with this invention is shown to comprise a buoyant body 1 having a passage 3 therethrough for a fishing line F. As illustrated, the body 1 is spherical, and the passage 3 is a diametrical passage. In the body 1 is a plunger guide opening 5 at an angle to and intersecting the fishing line passage 3. This guide opening is shown as being inclined with respect to the line passage 3, and leads from the outside of the body 1 all the way to one side of the line passage, also having a continuation 7 on the other side of the line passage. This continuation 7 terminates at 9 short of the outside of the body 1.

A plunger 11 is slidable in the plunger guide opening 5. This plunger is somewhat longer than the length of the opening 5 from the line passage 3 to the outside of the body 1, so that its outer end projects from the body. As illustrated, the plunger consists of a short tube, with its inner end bevelled as indicated at 13. It has a longitudinal slot 15. In the body 1 is a hole 17 intersecting the plunger guide opening 5 at right angles. A pin 19 fitted in the hole 17 extends through the slot 15 in the plunger.

Figure 3:
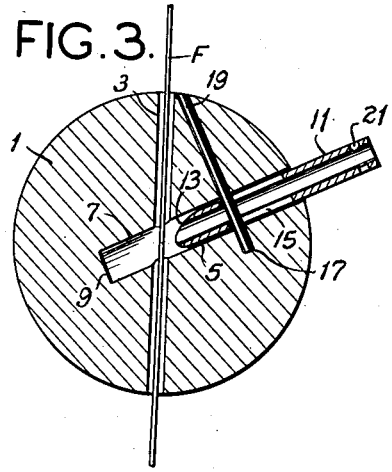
Fig. 3 is a section taken on line 3—3 of Fig. 2, illustrating a plunger in retracted position.
Figure 4:
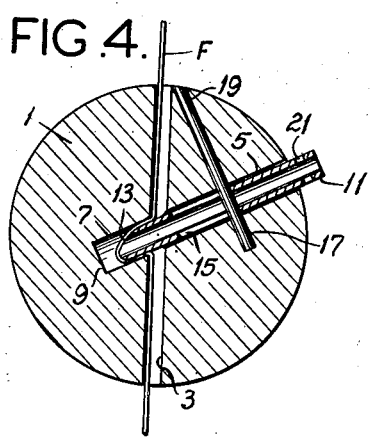
Fig. 4 is a section similar to Fig. 3 illustrating the plunger in line-wedging position.
Figure 5:
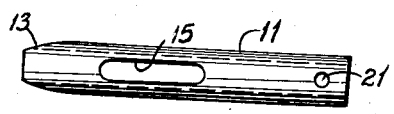
Fig. 5 is a plan view of the plunger per se.
Figure 6:
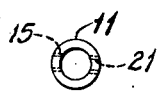
Fig. 6 is an end view of the plunger as viewed from the right end of Fig. 5.
Figure 1:
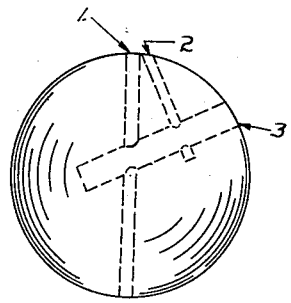
Figure 2:
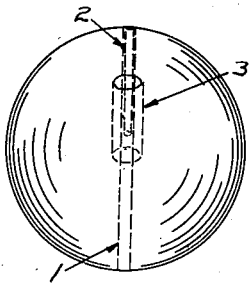
Figure 3:
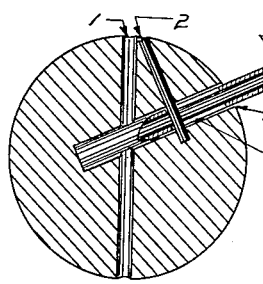
Figure 4:
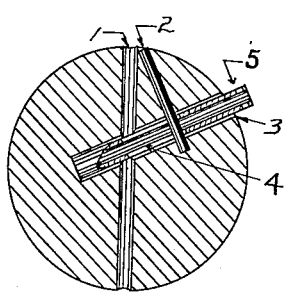
Figure 5:
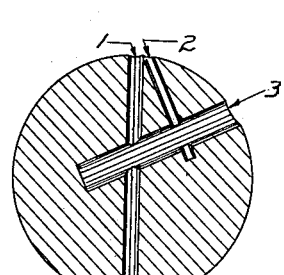
Figure 6:
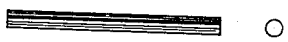
Figure 7:
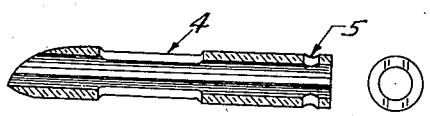
Figure 8:
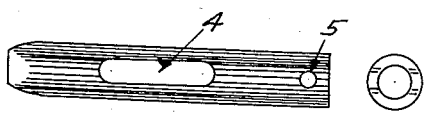

The pin 19 serves as a stop means carried by the body 1 and coacting with the plunger for determining a retracted position of the plunger (Fig. 3) wherein its inner bevelled end 13 is clear of the line passage 3, on the side of the line passage toward the open end of the plunger guide opening. The plunger is movable inward to a line-wedging position illustrated in Fig. 4 wherein its inner end extends into the continuation 7 of the guide opening 5 on the other side of the line passage, for wedging the fishing line into the continuation. The pin 19 also serves to prevent the plunger from coming out of the guide opening.

The retracted position of the plunger (Fig. 3) is determined by the engagement of the inner end of the slot 15 with the pin 19. The maximum line-wedging position of the plunger is determined by engagement of the outer end of the slot 15 with the pin 19.

Adjacent the outer end of the plunger 11 is a hole 21, for a purpose to be subsequently mentioned.

In using the float, with the plunger 5 in its retracted position (Fig. 3), the float may be moved up or down on the line to the point where the desired length of line extends from the float to the hook at the end of the line, and then the line in the plunger is pushed in to wedge the continuation 7 of the plunger guide opening 5. Release of the line may be accomplished either by manually pulling the plunger out by its outer end to its retracted position, or by tensioning the line sufficiently to cause the line to force the plunger outward. Tensioning the line may be accomplished in various way, as for example by pulling the line on opposite sides of the float, or by reeling in the line until the float engages the line guide at the end of the fishing rod or pole, or by holding the float in the hand and jerking the line.

If it is desired to use the float as a casting float, a knot may be tied in the line or a suitable stop applied to the line in the conventional manner at a distance from the free end of the line corresponding to the depth at which it is desired to have the hook at the end of the line. Then the free end of the line is threaded through the hole 21 adjacent the outer end of the plunger, and a sinker and hook put on the end of the line. With this arrangement, the float is slidable on the line between the aforesaid knot or stop and the sinker or hook. Upon casting and then slacking off the line, the weight of the sinker will pull down the line to the point where the knot or stop engages the plunger, thus stopping the hook at the desired depth for fishing.

The float of this invention causes no noticeable wear on the fishing line and has no loose parts which might become lost or misplaced. It has no parts which might be easily broken, and may be made of corrosion-resistant material to have a long life.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A fishing float comprising a buoyant body having a passage therethrough for a fishing line, said body also having a plunger guide opening therein intersecting said line passage, said guide opening leading from the outside of the body all the way to one side of the line passage and also having a continuation on the other side of the line passage, a plunger freely slidable in said guide opening and somewhat longer than the length of the opening from the line passage to the outside of the body so that its outer end projects from the body, and stop means carried by the body and coacting with the plunger for determining a retracted position of the plunger wherein its inner end is clear of the line passage on said one side thereof and in which position of the plunger the fishing line is freely slidable in the line passage and a line-wedging position of the plunger wherein its inner end extends into the continuation of said guide opening on said other side of the line passage for wedging the fishing line into said continuation, said stop means also preventing the plunger from coming out of the guide opening, said plunger being adapted to be moved from its line-wedging position to its retracted position either by pulling it outward by its outer end or in response to tensioning of the fishing line.

2. A fishing float as set forth in claim 1 wherein the plunger guide opening is inclined with respect to the line passage.

3. A fishing float as set forth in claim 1 wherein the continuation of the plunger guide opening terminates short of the outside of the body.

4. A fishing float as set forth in claim 1 wherein the plunger guide opening is inclined with respect to the line passage and wherein the continuation of the plunger guide opening terminates short of the outside of the body.

5. A fishing float as set forth in claim 1 wherein the inner end of the plunger is beveled.

6. A fishing float comprising a generally spherical buoyant body having a diametrical passage therethrough for a fishing line, said body also having a plunger guide opening therein at an angle to and intersecting said line passage, said guide opening leading from the outside of the body all the way to one side of the line passage and also having a continuation on the other side of the line passage, a plunger freely slidable in said guide opening and somewhat longer than the length of the opening from the line passage to the outside of the body, so that its outer end projects from the body, and stop means carried by the body and coacting with the plunger for determining a retracted position of the plunger wherein its inner end is clear of the line passage on said one side thereof and in which position of the plunger the fishing line is freely slidable in the line passage and a line-wedging position of the plunger wherein its inner end extends into the continuation of said guide opening on said other side of the line passage for wedging the fishing line into said continuation, said stop means also preventing the plunger from coming out of the guide opening, said plunger being adapted to be moved from its line-wedging position to its retracted position either by pulling it outward by its outer end or in response to tensioning of the fishing line.

7. A fishing float as set forth in claim 6 wherein the plunger guide opening is inclined with respect to the line passage.

8. A fishing float as set forth in claim 6 wherein the continuation of the plunger guide opening terminates short of the outside of the body.

9. A fishing float as set forth in claim 6 wherein the plunger guide opening is inclined with respect to the line passage and wherein the continuation of the plunger guide opening terminates short of the outside of the body.

10. A fishing float as set forth in claim 6 wherein the inner end of the plunger is beveled.

WILLIAM LEE KEEN.

REFERENCES CITED

The following references are of record in the file of this patent:

UNITED STATES PATENTS

| Number | Name | Date |
| --- | --- | --- |
| 928,439 | Gerrard | July 20, 1909 |
| 1,468,720 | Low | Sept. 25, 1923 |
| 2,162,659 | Wilson | June 13, 1939 |